May 18, 1948.  M. GOTTLIEB  2,441,811
GOVERNOR APPARATUS
Original Filed Sept. 27, 1943

INVENTOR
MANIOUS GOTTLIEB.
BY
ATTORNEY

Patented May 18, 1948

2,441,811

UNITED STATES PATENT OFFICE 2,441,811

GOVERNOR APPARATUS

Manious Gottlieb, Philadelphia, Pa., assignor to Westinghouse Electric Corporation, East Pittsburgh, Pa., a corporation of Pennsylvania Continuation of application Serial No. 503,913, September 27, 1943. This application December 30, 1947, Serial No. 794,749

1 Claim. (Cl. 264—7)

This application is a continuation of my earlier application Serial No. 503,913, filed September 27, 1943, now abandoned.

This invention relates to governor mechanism, more particularly to fly-weight governors of the force type as distinguished from the motion type, and has for an object to provide improved governor apparatus of this character.

Another object of the invention is to provide, in a strap-type fly-weight governor, auxiliary spring means resisting effects of centrifugal forces on the fly-weights.

A further object of the invention is to provide, in a strap-type fly-weight governor, an auxiliary spring having a variable scale.

Yet another object of the invention is to provide, in a fly-weight governor, an auxiliary spring of the strap-type.

On applications requiring wide speed range governors, such as fan drives, turbo-electric drives, etc., the size of the governor weights are, in effect, much too small when operating at the slower speeds. Therefore, with the standard strap-type governor, at the slower speeds, the available power from the governor is rather small and the speed regulation is rather large.

The present invention eliminates this difficulty by the addition of an auxiliary governor spring in the form of a relatively thin strap, bowed intermediate its ends, which permits the use of larger governor weights, resulting in greater governor power, better speed variation, etc.

Figure 1:
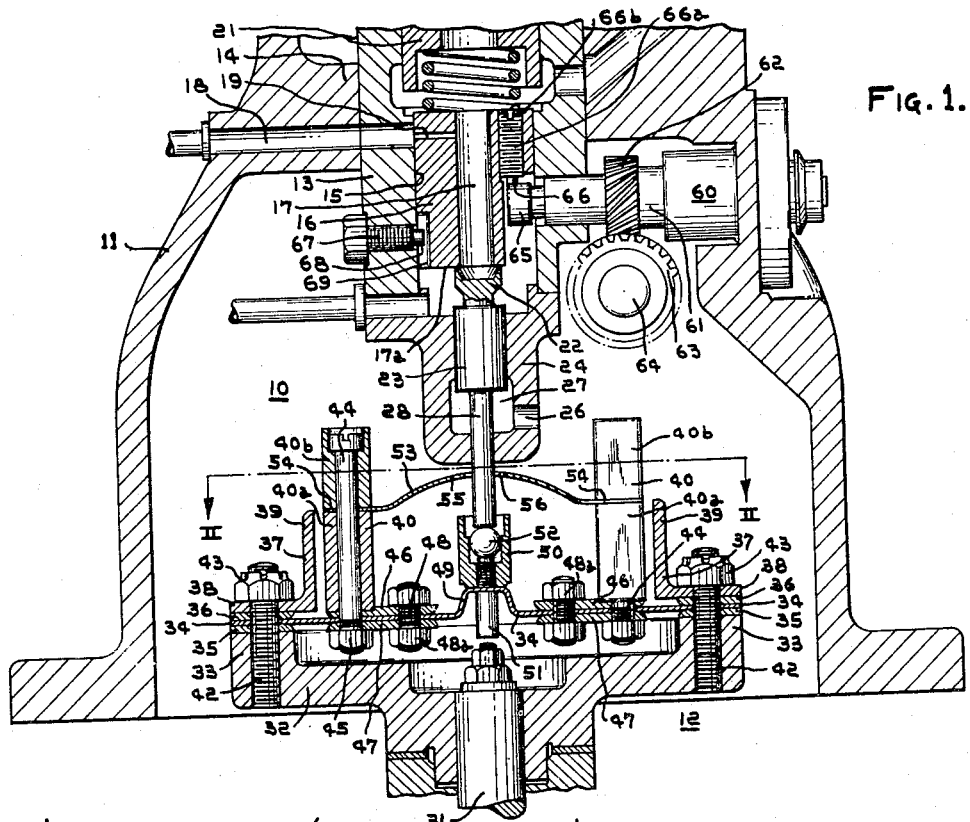
Fig. 1 is a vertical sectional view through control apparatus embodying the present invention.
Figure 3:
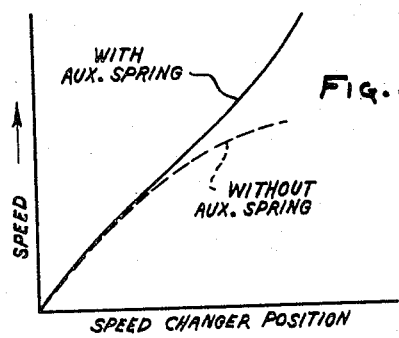
Figure 4:
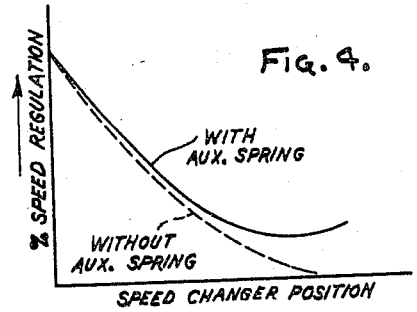

Referring now to the drawing more in detail, the numeral 10 indicates, in its entirety, control apparatus for a prime mover (not shown) and includes a housing 11 open at the bottom for reception of the governor mechanism, indicated in its entirety by the numeral 12. A hollow cylinder 13 extends vertically through the transverse wall 14 of the housing 11 and is provided with a bore 15, in which is slidably mounted a cylindrical block 16. The block 16 has a passage 17 extending vertically therethrough and to which high pressure oil is supplied through the inlet passage 18 of the housing 11 and the aligned orifice 19 in the block 16.

Fluid pressure within the passage 17 acts upwardly against the lower pressure surface of the relay 21 which, in turn, may operate in any suitable manner to effect control of the fluid admission valve to the prime mover. For a more detailed description of control apparatus of this character, reference is made to my Patent No. 2,237,780, granted April 8, 1941.

Discharge of high pressure oil from the passage 17 is controlled by the cup valve 22, carried at the upper end of the valve body 23, which is mounted for vertical sliding movement in the auxiliary housing 24, bolted or otherwise secured to the lower end of the hollow cylinder 13.

An opening 26 provides for flow of leaking oil or of air from and to the space 27 within the housing 24 below the valve body 23, to permit free movement of the latter. This opening may be omitted when maximum damping is desired.

A valve stem 28 depends axially from the valve body 23 for engagement by the force transmitting portion of the governor mechanism now to be described.

The governor mechanism includes a shaft 31 driven from the prime mover to be governed, and having secured thereto a collar or spider 32, having a pair of diametrically-opposed supports 33 extending upwardly from adjacent its periphery. A strap or leaf spring 34 has its terminal portions interposed between lower and upper spacer pieces 35 and 36, respectively. Angle members 37 have securing legs 38, disposed in overlying relation to the spacer pieces 36, and upstanding abutment legs 39 against which the elongated flyweights 40 may engage to limit their outward movement. The strap 34, spacer pieces 35 and 36, and securing leg 38 of the angle member 37 are secured to the support 33 by stud 42 and nut 43.

The elongated weights 40 are secured to the strap or leaf spring 34 near the terminal portions thereof by bolts 44 and cooperating nuts 45, the former extending through the weights, the strap, and spacer pieces 46 and 47. These spacer pieces are further joined by bolts 48 extending therethrough and having cooperating nuts 48a. It should be noted that both ends of the spacer pieces 46 and 47 and the inner ends of the spacer pieces 35 and 36 are rounded to prevent application of undue stresses to the strap 34 during bending of the latter.

Figure 2:
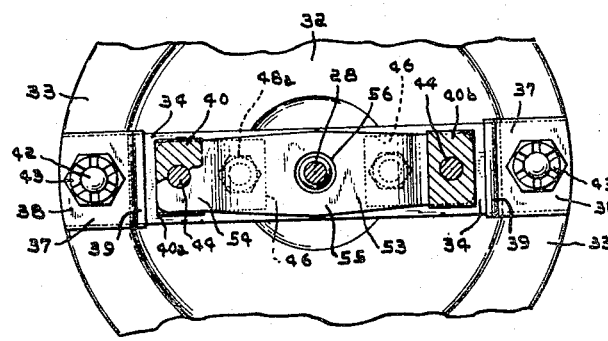
Fig. 2 is a sectional view taken along the line II—II of Fig. 1, looking in a direction indicated by the arrows; and, Figs. 3 and 4 are graphs indicating the improved results obtainable by use of the present invention, these graphs being based on the same size of governor weights for both "with" and "without" the auxiliary governor spring.

As shown in Fig. 2 the weights 40 have their centers of gravity in an axial plane of the collar or spider 32, and as illustrated in Fig. 1, the centers of gravity are spaced from the leaf spring 34 axially of the collar 32.

The strap or leaf spring 34 has an intermediate bent section 49, on the upper side of which is mounted a ball cage 50, the latter being secured to the bent section by the threaded pin 51, and the ball cage containing a ball 52, engaging with the lower end of the valve stem 28 on the valve body 23, whereby vertical movement of the intermediate bent section of the leaf spring 34, due to the action of centrifugal forces upon the weights 40, produces corresponding movement of the cup valve 22 toward or away from the block 16.

In order to provide increased resistance to outward radial movement of the weights 40, due to centrifugal force acting thereon, an auxiliary leaf spring 53, of relatively thin cross section, is positioned as shown in Fig. 1, with its straight terminal portions 54 secured to the weights 40, the straight terminal portions being connected by an intermediate bent or bowed portion 55, having an opening 56 through the central portion thereof for passage of the valve stem 28.

The weights 40 are each formed in two sections, a lower section 40a and an upper section 40b, the flat terminal portion of the auxiliary leaf spring 53 being clamped between the lower and upper sections 40a and 40b, respectively.

The auxiliary leaf spring 53, due to its bent or bowed intermediate section 55, acts with a varying scale, i. e., when the weights 40 start to move outward due to centrifugal force, the resisting force exerted by the spring 53 is relatively slight as result of straightening of the bend 55 of the latter. As outward movement of the weights continues, and the bend of the spring is further reduced, the resistance of the spring to outward movement of the weights becomes much greater.

From the structure so far described, it will be apparent that the governor tends to seek an equilibrium position with forces acting upwardly on the body member 23 balanced by those acting downwardly thereon. The upwardly-acting force due to the fly-weights is opposed by the spring force and by the force of pressure of liquid in the transformed or amplified liquid pressure space 17 and acting on the area of the cup valve exposed to the latter. With a given speed setting, the change in governor force from no load to full load is accompanied by a proportionate and larger liquid pressure change, the pressure ranging from a low value for full load to a high value for no load.

The operating range from no load to full load may be shifted in relation to speed by adjusting the plug 16 to position the seat 17a axially toward or away from the fly-weight governor. If the seat 17a is moved downwardly, the governor speed range from no load to full load is adjusted for a lower operating speed, and upward movement of the seat results in the contrary operation.

Upward and downward adjustment of the plug 16 for the purpose just indicated is effected by means of the speed changer apparatus, at 60, the latter comprising a stub shaft 61 connected by spiral gears 62 and 63 to the operating shaft 64. The inner end of the shaft 61 has a cam or eccentric 65 engaging a follower 66, which may be adjusted in any suitable manner axially in relation to the plug 16. As shown, the plug 66 has a shank 66a threaded with respect to the plug 16, the upper end of the shank having a kerf 66b which may be engaged by a suitable tool to effect desired adjustment of the follower. Thus, if the shaft 61 is turned, the plug 16 is moved axially to position the seat 17a as desired, downward movement of the seat resulting in lowering of the governed speed and vice versa. Rotation of this block with respect to the hollow cylinder 13 in which it is disposed is prevented by provision of the screw 67, whose point 68 extends into the vertical slot 69, provided in the side of the block 16.

Upward movement of the block or plug 16 necessitates corresponding upward movement of the cup valve 22 to obtain closing of the outlet from the bottom of the high-pressure passage 17 in the block 16, this further upward movement of the cup valve being obtainable by increased upward movement of the intermediate bent portion 49 of the strap or leaf spring 34, this movement in turn resulting from increased speed of rotation of the governor mechanism and its prime mover. Outward movement of the weights 40 is provided for largely by tilting thereof, the portions of the strap spring 34 between its terminal portions and the weight clamps functioning as spring hinges, whereby, as the outer ends of the weights move outwardly, the abutment portion 49 of the strap spring is moved axially to the extent required on account of longitudinal speed-setting adjustment of the plug 16. With a governor designed for good regulation at a given speed, as the speed setting is raised, the regulation becomes unduly large because flyweights suitable for the designed speed are too heavy for the higher speed. Therefore, in accordance with the present invention, the weights and the strap spring are designed to give good regulation at the lower end of the speed range; and, as the speed setting is raised, the weights tilt outwardly under the influence of centrifugal force, the leaf spring 53 operating to give spring resistance which progressively increases with outward movement of the weights to compensate for the weights being excessively heavy as the speed setting is raised. To provide for the leaf spring 53 performing satisfactorily in this respect, the ends of the latter are attached to the weights at a suitable distance from the strap spring 34 so that the increasing tangential travel of the weights toward the outer ends of the latter is effective to provide the stretching motion required for proper operation of the spring, the latter being bowed between the end portions thereof attached to the weights so as to provide for straightening with progressively increasing resistance as the weights move outwardly, the ends of the bowed portion being inclined to normals to the weights at an acute angle so that the bowed portion throughout the extent thereof has substantial components in the direction of pull exerted by the weights, in consequence of which the spring has the characteristic of giving the required progressively increasing spring resistance to outward movement of the weights. Therefore, with a strap governor designed for good regulation at an optimum speed, the range of speed adjustment may be extended upwardly without impairing the regulation to an objectionable extent, providing that the compensating spring giving increasing resistance as the weights move outwardly is used.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claim.

What is claimed is:

In a governor for controlling the flow of motive medium to a prime mover, means providing a space for liquid under governing pressure, pressure-responsive means exposed to space pressure and operable to control the flow of motive medium to the prime mover, a metering orifice for supplying liquid from a suitable pressure source to said space, a plug having a passage forming a part of said pressure space and constituting an escape port for the latter, a valve controlling the escape of liquid through said plug passage and having an area exposed to space pressure so that the force of the latter tends to move the valve in an opening direction to lower the space pressure, a member rotated by the prime mover, a strap spring extending diametrically of the rotary member and having its terminal portions attached to the latter, said strap spring being disposed flatwise in relation to a rotational plane of the rotary member and having a middle thrust portion, a thrust transmitting connection between middle portion and the control valve, a pair of fly-weights attached to the strap spring at opposite sides of the middle portion and spaced outwardly from the latter and inwardly from said terminal portions, said weights being elongated and extending lengthwise to one side of the strap spring so as to locate the centers of gravity thereof at the side of the strap spring to enable centrifugal force of the weights opposed by the force of the strap spring to be applied to the control valve in a direction tending to close the latter, means for varying the position of the plug in the direction of travel of the cup valve to effect speed-setting adjustment of the governor, and a leaf spring having its ends attached to the weights at points along the latter spaced outward from the strap spring, said leaf spring being bowed between the weights so that at each point along the bowed portion the component of its direction in the line of pull between the weights is much larger than its component at right angles to such line of pull, whereby movement of the weights outwardly is opposed by the leaf spring at a progressively increasing rate.

MANIOUS GOTTLIEB.

REFERENCES CITED

The following references are of record in the file of this patent:

UNITED STATES PATENTS

| Number | Name | Date |
|---|---|---|
| 685,039 | Foote | Oct. 22, 1901 |
| 995,037 | Smyth | June 13, 1911 |
| 1,709,463 | Crafts | Apr. 16, 1929 |
| 2,239,602 | Gottlieb | Apr. 22, 1941 |